UNITED STATES PATENT OFFICE.

HENRY BLUMENBERG, JR., OF ORO GRANDE, CALIFORNIA, ASSIGNOR TO CHEMICAL CONSTRUCTION COMPANY, OF LOS ANGELES, CALIFORNIA, A CORPORATION OF CALIFORNIA.

PROCESS OF MAKING POTASSIUM NITRATE.

1,297,640.     Specification of Letters Patent.     Patented Mar. 18, 1919.

No Drawing.     Application filed July 8, 1918. Serial No. 243,953.

*To all whom it may concern:*

Be it known that I, HENRY BLUMENBERG, Jr., a citizen of the United States, residing at Oro Grande, in the county of San Bernardino and State of California, have invented new and useful Improvements in Processes of Making Potassium Nitrate, of which the following is a specification.

My invention relates to a process of extracting potassium from refractory potassium containing minerals, especially silicates such as feldspar, cement dust, phonolite tailing, lepidolite and the like.

It is another object of this invention to produce potassium nitrate as an immediate product of the process.

In my U. S. patent for a process of extracting potassium from minerals No. 1214003, dated Jan. 30th, 1917, I have described a process of treating powdered feldspar with powdered sodium nitrate and subjecting the mixture to a temperature of 1200 to 1500° F. until the liberation of nitric oxid ceases, cooling and grinding the fused mass and treating the same with sulfuric acid.

It should be observed that the patented process depends upon the actual breaking down of the sodium nitrate, liberating the nitric oxid, while the sodium combines with silica of the feldspar to form an alkali metal silicate. The liberated nitric oxid fumes may be recovered in the form of a metal nitrate.

The present invention depends not on the actual breaking down of the metal nitrates in the presence of a silicious base but on a double decomposition process.

My invention consists of the steps of the process hereinafter described and claimed.

I found that by calcining feldspar at a temperature of about 1500° F. that the physical and chemical conditions of the feldspar are changed considerably. This is especially noticeable if the hot feldspar is put through a revolving furnace and dropped into water. It cracks and falls to pieces and the water will give a slightly alkaline reaction showing that some physical and chemical changes have occurred. I take the feldspar subjected to this preliminary roasting treatment and grind the same to pass through a 100 to 200 mesh screen and mix the same with a powdered metal nitrate preferably sodium nitrate. The mixture is heated for several hours up to a point slightly below the point of liberation of the nitric oxid fumes. The temperature required will be somewhat below 1000° F. A double decomposition will take place and the following equation is given to indicate the reaction taking place:

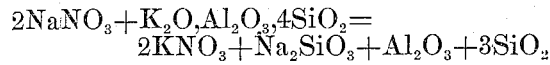

$$2NaNO_3 + K_2O, Al_2O_3, 4SiO_2 = 2KNO_3 + Na_2SiO_3 + Al_2O_3 + 3SiO_2$$

The potassium nitrate is formed on account of the intense affinity of nitrogen oxids for potassium. Furthermore, the potassium is the strongest base present in the feldspar.

The temperatures employed are not sufficiently high to cause the aluminum oxids to combine with the silica to form aluminum silicates and therefore the aluminum oxid is not affected in the reaction. The sodium combines with the silica to form sodium silicates. The analysis of the resulting product shows a content of 65 to 90 per cent. of potassium nitrate calculated on the possible theoretical potassium nitrate content.

I now treat the fused mass with boiling water for several hours in order to extract the potassium nitrate. This extraction is facilitated if the boiling takes place under a pressure of 4 to 5 atmospheres. The excess of silica and the aluminum oxid remain as insoluble residue.

I prefer to subject the feldspar to a preliminary roasting prior to grinding although such preliminary roasting is not necessary. The preliminary roasting of the feldspar, however, facilitates its subsequent grinding considerably; it also changes the chemical nature of the feldspar so that the chemical reactions with the sodium nitrate take place without difficulty. When feldspar is used without the preliminary roasting it is best to use an excess of sodium nitrate, also to boil the fused mass with water under pressure.

It usually requires from six to eight hours to complete the reaction of the fused mass in the furnace. The reaction in the furnace is facilitated by using an excess of sodium nitrate.

I have found that feldspar containing 10 per cent. of potassium calculated in the form of potassium oxid, $K_2O$, will produce from 70 to 90 per cent. of soluble $K_2O$ as potassium nitrate by this process.

It will thus be seen that I have devised a process of producing potassium nitrate from refractory potassium containing silicates such as feldspar and the like, or other potassium containing materials, by the treatment with a metal nitrate and heating the same just below the liberation point of the nitric acid radical, thereby producing potassium nitrate as an immediate product which is easily extracted with water. Another advantage of this process is that low temperatures are used, thus avoiding the wear and tear of the apparatus. The loss of the sodium nitrate is very low, not exceeding 2 to 8 per cent. of the quantity used.

Various changes in the steps of my process may be made by those skilled in the art without departing from the spirit of my invention as claimed.

I claim:

1. A process of making potassium nitrate, comprising heating a refractory potassium containing silicate with sodium nitrate to a point below where nitric oxid fumes are liberated until fusion takes place thereby forming potassium nitrate and sodium silicate and treating the fused mass with water to extract the potassium nitrate.

2. A process of making potassium nitrate, comprising heating a mineral containing potassium in an insoluble form with sodium nitrate to a point below where nitric oxid fumes are liberated until fusion takes place and potassium nitrate is formed and separating the potassium nitrate from the fused mass.

3. A process of making potassium nitrate, comprising heating a mineral containing potassium in an insoluble form with a metal nitrate to a point below where nitric oxid fumes are liberated until fusion takes place and potassium nitrate is formed and separating the potassium nitrate from the fused mass.

4. A process of making potassium nitrate comprising subjecting a refractory potassium containing silicate to calcination and grinding and mixing the same with a metal nitrate, heating the mixture to a point below where nitric oxid fumes are liberated until fusion takes place and potassium nitrate is formed and separating potassium nitrate from the fused mass.

5. A process of making potassium nitrate comprising heating a refractory potassium containing mineral with a metal nitrate to a point below where nitric oxid fumes are liberated until fusion takes place and potassium nitrate is formed and extracting the potassium nitrate by boiling with water under pressure.

In testimony whereof I have signed my name to this specification.

HENRY BLUMENBERG, Jr.

Copies of this patent may be obtained for five cents each, by addressing the "Commissioner of Patents, Washington, D. C."